March 31, 1925.
W. W. HAWKINS
MAGNETO
Filed Sept. 10, 1921   2 Sheets-Sheet 1
1,531,556
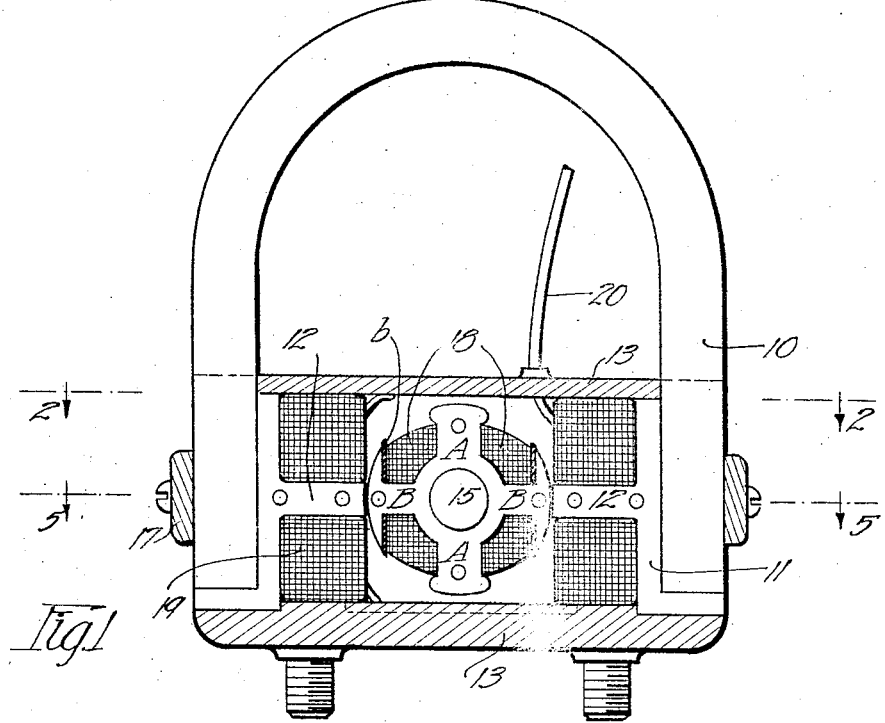
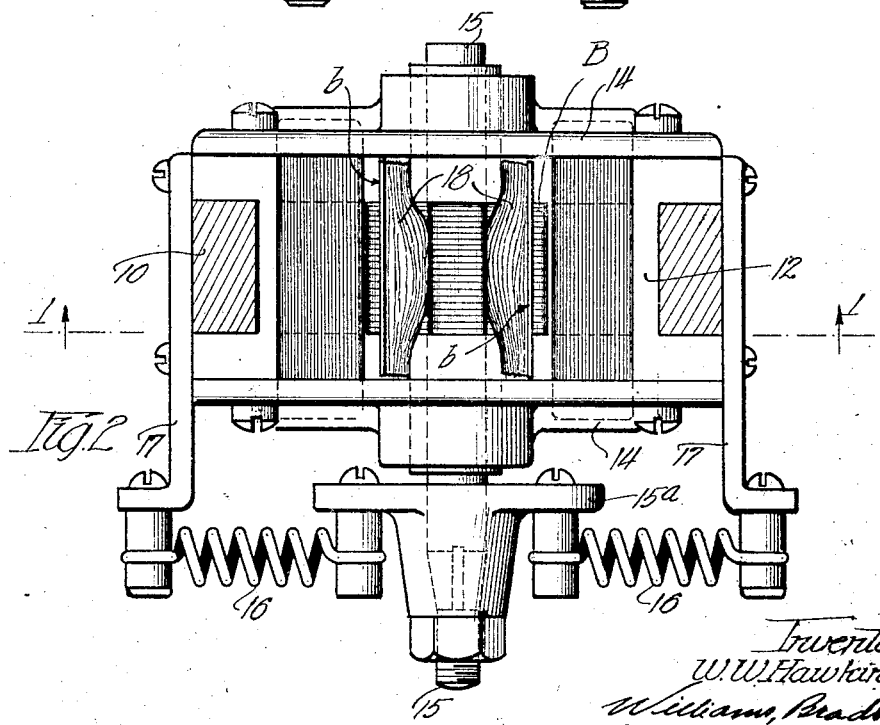

March 31, 1925.  1,531,556
W. W. HAWKINS
MAGNETO
Filed Sept. 10, 1921   2 Sheets-Sheet 2
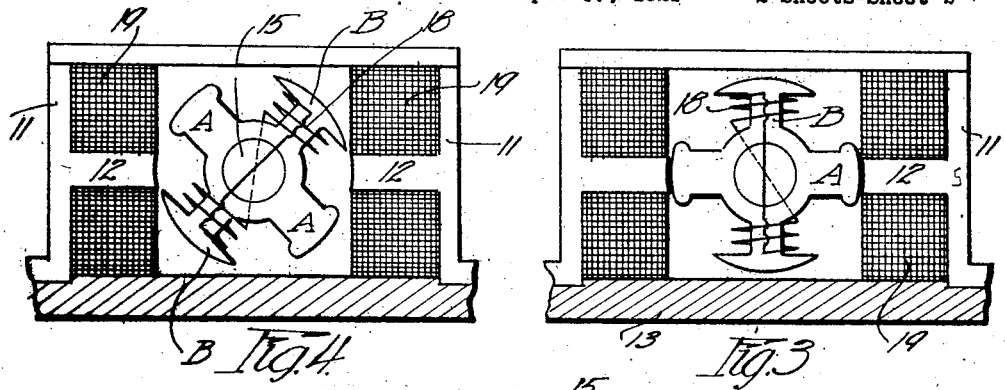
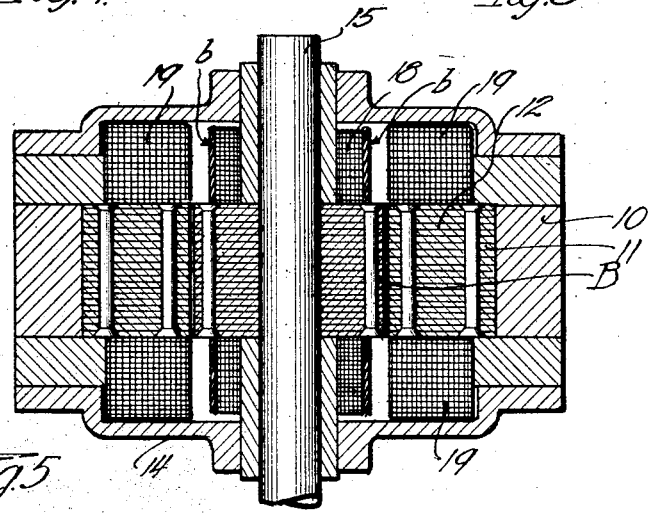
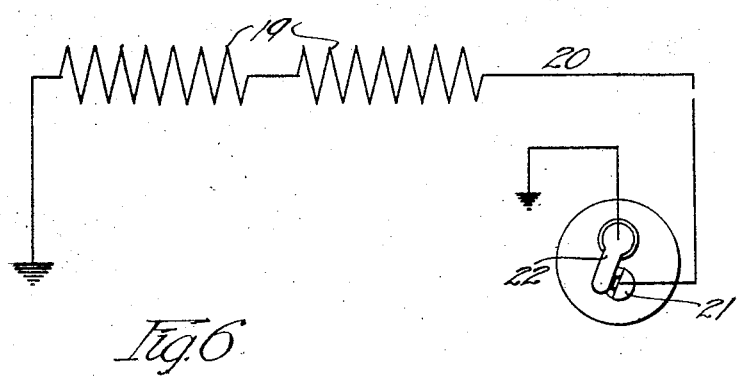
Inventor
W. W. Hawkins Patented Mar. 31, 1925.

1,531,556

UNITED STATES PATENT OFFICE.

WILLIAM W. HAWKINS, OF BROOKLYN, NEW YORK, ASSIGNOR TO WEBSTER ELECTRIC COMPANY, OF RACINE, WISCONSIN, A CORPORATION OF WISCONSIN.

MAGNETO.

Application filed September 10, 1921. Serial No. 499,768.

*To all whom it may concern:*

Be it known that I, WILLIAM W. HAWKINS, a citizen of the United States, and resident of Brooklyn, in the county of Kings and State of New York, have invented a certain new and useful Improvement in Magnetos, of which the following is a full, clear, concise, and exact description, reference being had to the accompanying drawings, forming a part of this specification.

My invention contemplates the provision of an inductor type magneto involving a novel plan or principle of operation, which enables me to secure excellent results from a machine of extremely simple and rugged construction.

One of the salient features of the machine is a wire wound motor or inductor which, when in one position, establishes a low reluctance path for flux between the stationary coil carrying pole pieces of a permanent magnet field structure and which, when in another position, establishes a comparatively sluggish path between said pole pieces. The wire carried by the rotor or inductor is preferably permanently short-circuited, and, when so short-circuited, requires nothing in the nature of breaker mechanism to cause it properly to function.

My invention is particularly useful when embodied in "oscillators" and for that reason I have chosen to illustrate an oscillating ignition magneto in which my invention has been incorporated. I appreciate, however, that my invention is applicable to other types of magnetos.

In the accompanying drawings:

Figure 1 is a view partly in elevation and partly in vertical section of an oscillating magneto embodying my invention;

Figure 2 is a horizontal section taken on line 2—2 of Figure 1 and looking in the direction indicated by the arrows;

Figure 3 is a diagram illustrating the magneto rotor in its "cocked" position;

Figure 4 is a similar diagram which illustrates the rotor as having been recoiled to the position where the rate of change of flux traversing the stator windings is at a maximum;

Figure 5 is a detailed sectional view which may be regarded as having been taken on line 5—5 of Figure 1; and Figure 6 is a circuit diagram.

Similar characters of reference refer to similar parts throughout the several views.

Referring first to Figures 1 and 2, reference numeral 10 indicates a permanent magnet which is provided with pole pieces 11, the pole pieces being provided with oppositely disposed polar projections 12—12. Pole pieces 11—11 are preferably of laminated construction and are carried rigidly with the non-magnetic frame or housing 13. Frame or housing 13 is preferably provided with a pair of removable side plates 14—14 which serve to journal the rotor shaft 15. Keyed, or otherwise secured to the shaft 15 is the conventional yoke 15ª which is connected by relatively heavy tension springs 16—16 with non-magnetic brackets 17—17, the latter being screwed, or otherwise rigidly secured, to the frame or housing 13. An incidental function of brackets 17—17 is to hold the magnet legs tightly in contact with pole pieces 11.

It will be understood that an oscillating magneto ignition equipment embodying the generating unit herein illustrated will comprise some suitable and well-known means (not shown) adapted to move the rotor shaft 15 to "cocked" position against the tension of springs 16—16 and there to release the rotor shaft for rapid recoil under the influence of the actuating springs. Such an oscillating magneto ignition equipment would also comprise a suitable and well-known form of ignitor and equally well-known mechanism for separating the ignitor electrodes in timed relation to both the recoil of the magneto rotor shaft and the cycle of the engine with which the ignition equipment is employed. I have not deemed is necessary to illustrate the magneto tripping mechanism nor the electrical or mechanical connection between the magneto rotor shaft and the ignitor. These devices are well-known in the art to which my invention relates.

The rotor shaft 15 carries a rotor or inductor of substantially cruciform shape. The rotor or inductor consists of a plurality of soft iron laminæ which are rigidly mounted upon shaft 15. The arms of the rotor or inductor are designated at AA and BB. It will be noted that the arms BB carry coils 18—18. The arms AA are devoid of coils. The coils 18—18 are permanently short-circuited. Thus in the drawings, I have illustrated each end of each coil 18 as being permanently electrically connected with one of the ends of the other coil 18. This arrangement is merely representative. The coils 18—18 might be individually short-circuited either by bringing the ends of each coil together or by grounding the ends of each coil to the rotor iron. Furthermore, one end of each coil might be connected to an adjacent end of the other coil, the other ends of the coils being grounded to the rotor iron. I find it convenient to provide retaining plates b—b under the shoulders of the rotor arms BB to prevent accidental displacement of those portions of the coils 18—18 which lie at the ends of the rotor.

The pole piece projections 12—12 carry generating windings 19—19. The generating windings are preferably connected in series, one side of the generating windings being grounded in the usual manner, the other side being connected with the insulated terminal lead 20. In the usual form of magneto ignition equipment the lead 20 will be connected with the insulated electrode of any suitable form of ignitor. In Figure 6 the fixed and movable ignitor electrodes are illustrated at 21 and 22, respectively.

The normal position of the rotor is shown in Figure 1. In the operation of the magneto, the rotor is periodically moved to the position shown in Figure 3 and is there released. With the rotor in the position shown in Figure 3, a low reluctance path between the pole pieces is established through rotor arms AA. When the rotor is released it is quickly moved by the operating springs toward the position shown in Figure 1. When, upon recoil, the rotor reaches approximately the position illustrated in Figure 4, the peak of the current wave created in the generating circuit will be attained. Hence, the igniter electrode should be separated at, or shortly after, the rotor reaches the position shown in Figure 4. As the rotor swings on toward normal in the position shown in Figure 4, the rotor arms BB sweep into position opposite the pole piece projections 12—12. The arms BB, momentarily at least, constitute a sluggish flux path because of the inductance of the winding 18—18. Because of the inductance of windings 18—18, the permanent magnet flux is practically excluded from the rotor arms BB when the latter first spring into position opposite the polar projections 12—12. Instead of in any way impairing the effectiveness of the generated current, the arms BB and their associated coils seem to improve the form of the generated wave, giving the wave a characteristically flat peak. The sharp peak heretofore thought to be no more than characteristic of inductor type of machines is very considerably flattened by the improvements of my invention.

It should be understood that the windings 18—18 in no way impair the efficacy of rotor arms BB in their function as a keeper for the permanent magnet when the magneto is not in operation.

Having thus described my invention, what I claim is new and desire to secure by Letters Patent of the United States is:

1. In a magneto, a magnet provided with pole pieces, a generating winding on one of said pole pieces, and means adapted first to establish a low reluctance magnetic path for flux between the pole pieces and then to establish a relatively sluggish low reluctance path for flux between the pole pieces.

2. In a magneto, a magnet and pole pieces of opposite polarity therefor, a generating winding inductively related to one of said pole pieces, a four-armed inductor disposed between and adapted to move relatively to said pole pieces, two of said arms constituting a low reluctance path for flux, the other arms constituting a second path for flux, together with an inductance coil associated with said second flux path.

3. In a magneto, a magnet, pole pieces therefor, a generating winding inductively related to one of said pole pieces, a four-armed inductor disposed between and adapted to move relatively to said pole pieces, two of said arms adapted to constitute a low reluctance path for flux when disposed opposite said pole pieces, the other arms adapted to constitute a relatively sluggish path for flux when disposed opposite said pole pieces, together with a short-circuited coil disposed around the second path aforesaid.

4. In a magneto, a permanent magnet, pole pieces therefor, a generating winding inductively related to one of said pole pieces, and a rotor, said rotor comprising magnetic portions adapted to constitute two flux paths between the pole pieces, one of said flux paths being of low reluctance, a portion of the other path carrying a coil and being characterized by slowness of its magnetization.

5. In a magneto, a permanent magnet, pole pieces therefor, a generating winding inductively related to one of said pole pieces, and a rotor, said rotor comprising magnetic portions adapted to constitute two flux paths, one of said flux paths being characterized by low reluctance, a portion of the other flux path carrying a permanently short-circuited coil and being characterized by relatively sluggish low reluctance.

6. A magneto comprising a field magnet provided with opposed pole pieces, a stationary generating coil inductively related to one of the pole pieces and a four-pronged rotor co-operating with said pole pieces, two diametrically opposite prongs of the rotor being provided with short-circuited windings, the other prongs being devoid of windings.

7. A magneto comprising a magnetic field structure having opposed pole pieces, a generating coil on one of said pole pieces, a rotor comprising a plurality of prongs adapted to co-operate with the pole pieces and a short-circuited winding on one of said prongs.

8. A magneto comprising a field structure including pole pieces, a generating coil in inductive relation to one of the pole pieces and a rotor co-operating with the pole pieces, said rotor comprising a plurality of prongs and having a short-circuited winding on one of the prongs.

9. An inductor magneto comprising a permanently magnetic field structure having a generating coil in inductive relation to one of its poles and a rotor co-operating with the poles of the field structure to vary the flux traversing said coil, said rotor comprising a plurality of prongs and having a short-circuited winding on one of the prongs.

10. A magneto comprising a field magnet provided with opposed pole pieces, a stationary generating coil carried by and in inductive relation to each of said pole pieces and a four-pronged inductor operating between said pole pieces, two opposite prongs of said rotor being provided with short-circuited windings, the other prongs being devoid of windings.

11. A magneto comprising a permanent magnet, pole pieces for said magnet, said pole pieces being provided with oppositely disposed polar projections, generating windings inductively related to said polar projections, an inductor of substantially cruciform shape disposed between and adapted for movement relatively to said polar projections, two of the oppositely located arms of said inductor being devoid of windings, the other arms carrying permanently short-circuited coils which materially increase the sluggishness of the flux path afforded by the arms which carry said coils.

12. A magneto of the oscillating type comprising a pair of oppositely disposed pole pieces, a generating winding in inductive relation to one of said pole pieces, a cruciform rotor movable between said pole pieces, an inductance coil carried by one of the arms of said rotor, means for "cocking" the rotor to a position wherein a path between the pole pieces is established through a diametrically opposite pair of rotor arms, and spring means for quickly moving the rotor to a position wherein a path between the pole pieces is established through the other pair of rotor arms, said last mentioned pair of rotor arms comprising the one provided with the inductance coil.

In witness whereof, I hereunto subscribe my name this 22d day of August, 1921.

WILLIAM W. HAWKINS.

Witnesses:
JOHN J. KELLY,
WILLIAM A. O'DONNELL.